(12) United States Patent
Jaranson et al.

(10) Patent No.: US 11,376,995 B1
(45) Date of Patent: Jul. 5, 2022

(54) VEHICLE SEATING ASSEMBLY

(71) Applicant: Ford Global Technologies, LLC, Dearborn, MI (US)

(72) Inventors: John Wayne Jaranson, Dearborn, MI (US); Marcos Silva Kondrad, Macomb, MI (US); Patrick Maloney, Livonia, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 17/162,139

(22) Filed: Jan. 29, 2021

(51) Int. Cl.
*B60N 2/23* (2006.01)
*B60N 2/22* (2006.01)

(52) U.S. Cl.
CPC ........... *B60N 2/233* (2013.01); *B60N 2/2231* (2013.01)

(58) Field of Classification Search
CPC .............................. B60N 2/233; B60N 2/2231
USPC ................. 297/361.1, 362.11, 342, 343, 341
See application file for complete search history.

(56) References Cited

U.S. PATENT DOCUMENTS

| | | | | |
|---|---|---|---|---|
| 2,859,797 A | * | 11/1958 | Mitchelson | B60N 2/874 |
| | | | | 296/65.18 |
| 5,556,157 A | * | 9/1996 | Wempe | A61G 5/1067 |
| | | | | 297/423.26 |
| 6,390,554 B1 | * | 5/2002 | Eakins | A61G 5/006 |
| | | | | 297/65 |
| 6,695,378 B2 | | 2/2004 | Hanagan | |
| 7,780,230 B2 | | 8/2010 | Serber | |
| 8,646,795 B2 | * | 2/2014 | Cerreto | B60N 2/22 |
| | | | | 297/354.12 |
| 9,326,608 B1 | | 5/2016 | Hoy et al. | |
| 10,343,558 B2 | | 7/2019 | Stevens et al. | |
| 2015/0137571 A1 | | 5/2015 | Koike et al. | |

FOREIGN PATENT DOCUMENTS

FR 2546827 A * 12/1984

* cited by examiner

*Primary Examiner* — Milton Nelson, Jr.

(74) *Attorney, Agent, or Firm* — Vichit Chea; Price Heneveld LLP (57) ABSTRACT

A vehicle seating assembly includes a seatback movable between an upright position and a reclined position relative to a seat base. A track assembly includes a bracket slidably received by a rail. The bracket is operably coupled with at least one of the seatback and the seat base. A rear support assembly is positioned to extend at least partially along the seatback and includes a base operably coupled with the seatback. First and second struts extend downward from the base, and one of the first and second struts is pivotally coupled with a back end of the bracket. An actuator assembly is operably coupled with the base and is configured to move the seatback between the upright position and the reclined position.

18 Claims, 7 Drawing Sheets

VEHICLE SEATING ASSEMBLY

FIELD OF THE DISCLOSURE

The present disclosure generally relates to a vehicle seating assembly, and more specifically, to a vehicle seating assembly having a movable rear support assembly.

BACKGROUND OF THE DISCLOSURE

Vehicle seating assemblies often need to be adjusted to selected seating positions to accommodate various occupants and vehicle seating assembly configurations. For example, the recline of the vehicle seating assembly may need to be adjustable.

SUMMARY OF THE DISCLOSURE

According to one aspect of the present disclosure, a vehicle seating assembly includes a seatback movable between an upright position and a reclined position relative to a seat base. A track assembly includes a bracket slidably received by a rail. The bracket is operably coupled with at least one of the seatback and the seat base. A rear support assembly is positioned to extend at least partially along the seatback and includes a base operably coupled with the seatback. First and second struts extend downward from the base, and one of the first and second struts is pivotally coupled with a back end of the bracket. An actuator assembly is operably coupled with the base and is configured to move the seatback between the upright position and the reclined position.

Embodiments of this aspect and/or the other aspects of the disclosure can include any one or a combination of the following features:
- seatback directly coupled with a bracket at a pivot;
- a lift assembly configured to couple a seat base with a bracket;
- a bracket including a central portion positioned forward of an end of the bracket, wherein the central portion and the end of the bracket each extend upward toward a seat base;
- a seatback rotatably coupled with a central portion of a bracket;
- a base including a vertically extending rack and an actuator assembly including a pinion gear configured to be engaged with the rack, wherein rotation of the pinion gear along the rack is configured to move a seatback between an upright position and a reclined position;
- an actuator assembly including a spindle coupled with the base and a nut rotatably coupled with a spindle, wherein the nut is fixedly coupled with a seatback such that movement of the nut along the spindle moves the seatback between thane upright position and a reclined position; and/or
- each of first and second struts includes an end cap pivotally coupled with an end of the bracket.

According to another aspect of the present disclosure, a vehicle seating assembly includes a seatback movable between an upright position and a reclined position and a track assembly including a bracket. The seatback is pivotally coupled with the bracket. A rear support assembly is positioned to extend at least partially along the seatback and includes a base operably coupled with the seatback and first and second struts extending downward from the base. One of the first and second struts is pivotally coupled with an end of the bracket. An actuator assembly is fixedly coupled with the seatback and is configured be operably engaged with the rear support assembly to move the seatback between the upright position and the reclined position.

Embodiments of this aspect and/or the other aspects of the disclosure can include any one or a combination of the following features:
- a base of a rear support assembly slidably coupled with a rear surface of a seatback;
- a seatback defining an opening and an actuator assembly aligned with the opening;
- a seatback including a bracket extending about an opening and configured to at least partially support an actuator assembly;
- a base including a frame having opposing interior edges and a vertically extending rack positioned on one of the interior edges, wherein the rack defines a plurality of teeth;
- an actuator assembly including a pinion gear configured to be engaged with a rack such that rotation of the pinion gear along the rack is configured to move a seatback between an upright position and a reclined position; and/or
- a seat base operably coupled with a bracket and spaced apart from a seatback.

According to another aspect of the present disclosure, a vehicle seating assembly includes a seatback movable between an upright position and a reclined position and a track assembly including a bracket. The seatback is pivotally coupled with the bracket. A rear support assembly is positioned to extend at least partially along the seatback and includes a base operably coupled with the seatback and first and second struts extending downward from the base. One of the first and second struts is pivotally coupled with a back end of the bracket. An actuator assembly is fixedly coupled with the base and is configured to move the base linearly along the seatback to move the seatback between the upright position and the reclined position.

Embodiments of this aspect and/or the other aspects of the disclosure can include any one or a combination of the following features:
- a base including a frame defining a receiving well configured to at least partially receive an actuator assembly;
- an actuator assembly including an actuator fixedly coupled with a frame and a spindle rotatably driven by the actuator and having a free end received by and rotatable within a receiving well;
- a nut movable along a spindle and fixedly coupled with a rear surface of a seatback; and/or
- a seat base operably coupled with the bracket and spaced apart from the seatback.

These and other aspects, objects, and features of the present disclosure will be understood and appreciated by those skilled in the art upon studying the following specification, claims, and appended drawings.

DETAILED DESCRIPTION OF THE DISCLOSURE

The present illustrated embodiments reside primarily in combinations of method steps and apparatus components related to a rear support assembly for a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
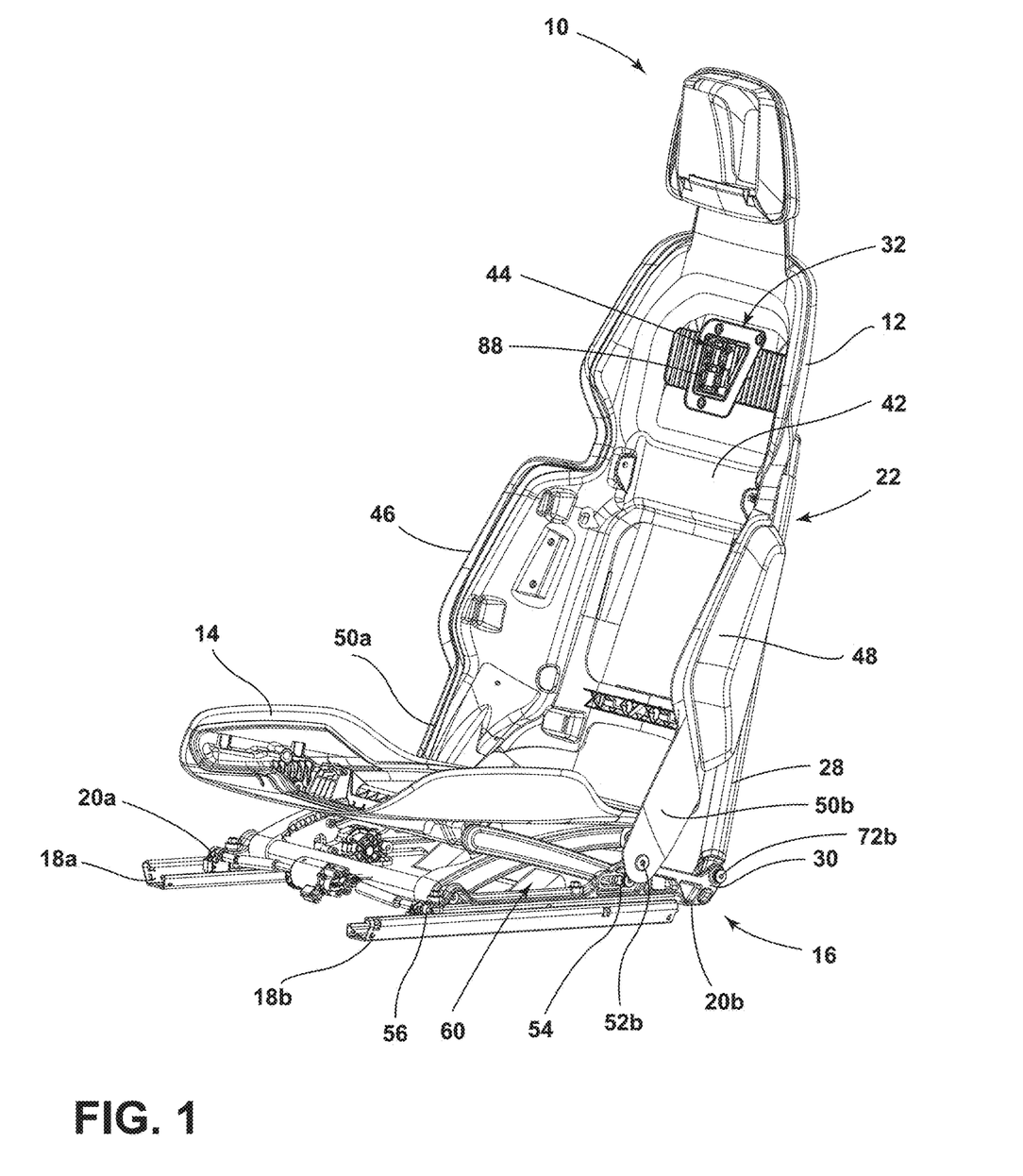
FIG. 1 is a side perspective view of a vehicle seating assembly including a movable rear support, according to various examples.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-7, reference numeral 10 generally designates a vehicle seating assembly that includes a seatback 12 movable between an upright position and a reclined position relative to a seat base 14. A track assembly 16 includes a rail 18a, 18b configured to slidably receive a bracket 20a, 20b. The bracket 20a, 20b is operably coupled with at least one of the seatback 12 and the seat base 14. A rear support assembly 22 includes a base 24 operably coupled with the seatback 12. First and second struts 26, 28 extend downward from the base 24. One of the first and second struts 26, 28 is pivotally coupled with an end 30a, 30b of the bracket 20a, 20b. An actuator assembly 32 is operably coupled with the base 24 to move the seatback 12 between the upright position and the reclined position.

Figure 2:
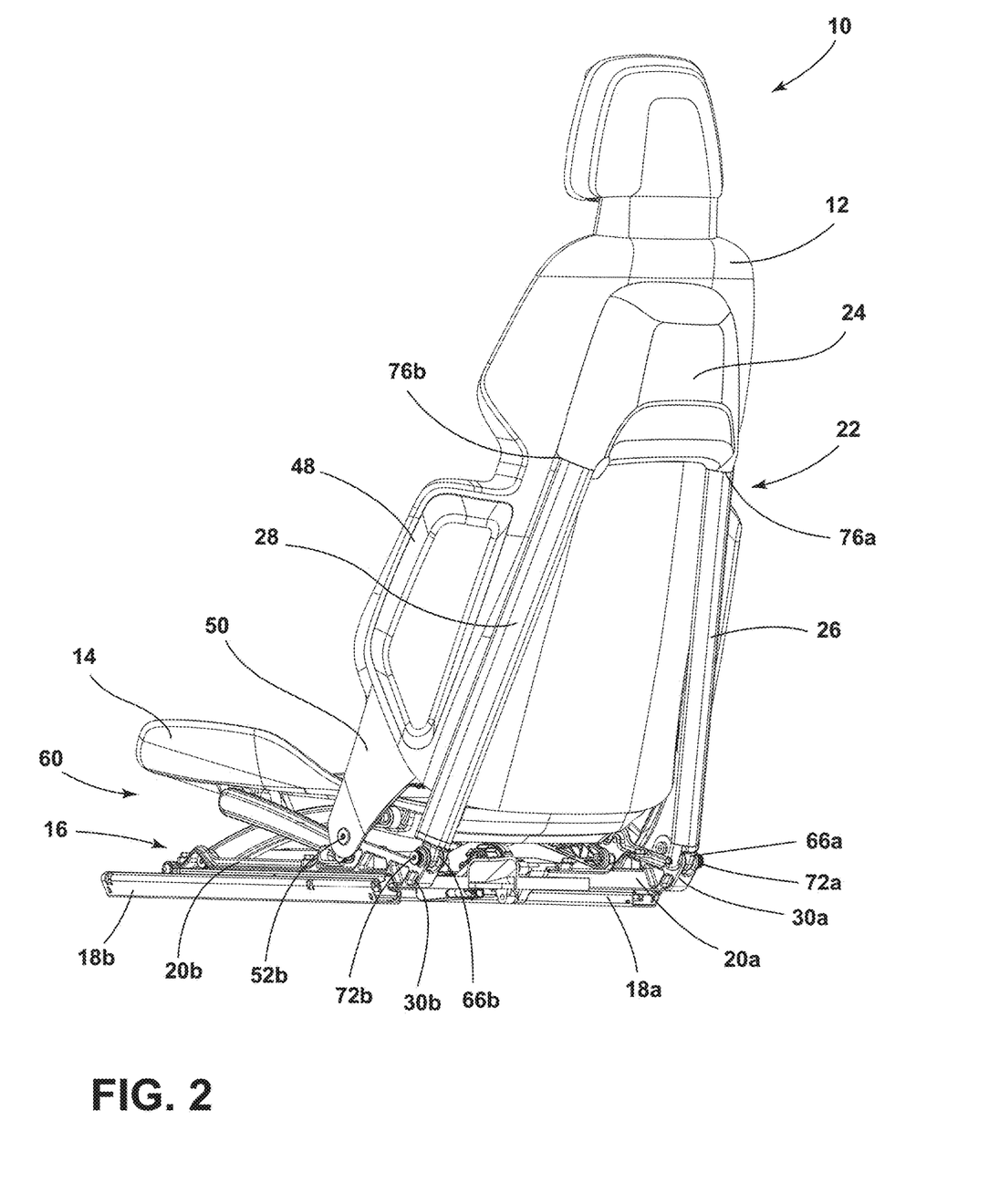
FIG. 2 is a rear perspective view of the vehicle seating assembly of FIG. 1.

Referring now to FIGS. 1 and 2, the vehicle seating assembly 10 is illustrated including the seatback 12, the seat base 14, and the rear support assembly 22. Each of the seatback 12, the seat base 14, and the rear support assembly 22 is at least partially supported by the brackets 20a, 20b of the track assembly 16, as discussed in more detail below. It will be understood that the brackets 20a, 20b may be slidably coupled with the rails 18a, 18b such that the brackets 20a, 20b are supported by slides within the rails 18a, 18b or such that the brackets 20a, 20b are slides positioned within the rails 18a, 18b without departing from the scope of the present disclosure.

As best shown in FIG. 1, the seatback 12 includes a body 42 defining an opening 44. The opening 44 is positioned proximate an upper end of the body 42 and is configured to be aligned with the rear support assembly 22, as described in more detail elsewhere herein. The seatback 12 further includes first and second lateral wings 46, 48 framing the body 42 of the seatback 12. The first and second lateral wings 46, 48 may each extend forward and outward of the body 42 of the seatback 12 and may be sized to frame the seat base 14. As illustrated, the first and second wings 46, 48 may be substantially symmetrical about the body 42. However, it is contemplated that the first and second wings 46, 48 may be asymmetrical in various configurations without departing from the scope of the present disclosure.

Referring now to FIGS. 1 and 2, the seatback 12 further includes a first arm 50a extending downward from the first lateral wing 46 and a second arm 50b extending downward from the second lateral wing 48. The first arm 50a may be integrally formed with the first lateral wing 46 or may be coupled with the first lateral wing 46. The second arm 50b may be integrally formed with the second lateral wing 48 or may be coupled with the second lateral wing 48. The first arm 50a may be coupled with the first bracket 20a of the track assembly 16 at a pivot 52a, and the second arm 50b may be coupled with the second bracket 20b of the track assembly 16 at a pivot 52b. It is contemplated that the first and second arms 50a, 50b may be substantially symmetrical.

Referring still to FIGS. 1 and 2, it will be understood that the first and second rails 18a, 18b and the first and second brackets 20a, 20b are positioned to mirror one another such that the same or similar features are present on each of the first and second rails 18a, 18b and each of the first and second brackets 20a, 20b. With reference now to FIG. 1, the second bracket 20b is described in detail with the understanding that the first bracket 20a includes the same or similar components and features.

The bracket 20b includes a front end 56 positioned forward of the vehicle seating assembly 10 proximate the seat base 14. The front end 56 is spaced apart from a back end 30b of the bracket 20b. Each of the front end 56 and the back end 30 of the bracket 20b may extend upward from the rail 18b toward the vehicle seating assembly 10. A central portion 54 of the bracket 20b may be positioned between the front end 56 and the back end 30b and may further extend upward toward the vehicle seating assembly 10. As previously introduced, the arm 50b of the second lateral wing 48 may be coupled with the bracket 20b at a pivot 52b. As illustrated, the pivot 52b is positioned on or proximate the central portion 54 of the bracket 20b. The pivot 52b may be any pivot member including, but not limited to, for example, screws, pins, bolts, etc. The pivot 52b is configured to fix the arm 50*b* to move laterally with the bracket 20*b* while being able to rotate about the pivot 52*b* as needed.

The seat base 14 may further be coupled with a lift assembly 60. The lift assembly 60 may be configured to be coupled with the bracket 20*b* at one or both of the front end 56 and the central portion 54. The lift assembly 60 may be configured to support the seat base 14 such that the seat base 14 is independent of the seatback 12. As best shown in FIGS. 1 and 2, the lift assembly 60 is exemplarily illustrated as a scissor lift assembly. However, it is contemplated that other configurations may be used for coupling the seat base 14 with the bracket 20*b* without departing from the scope of the present disclosure.

Figure 3:
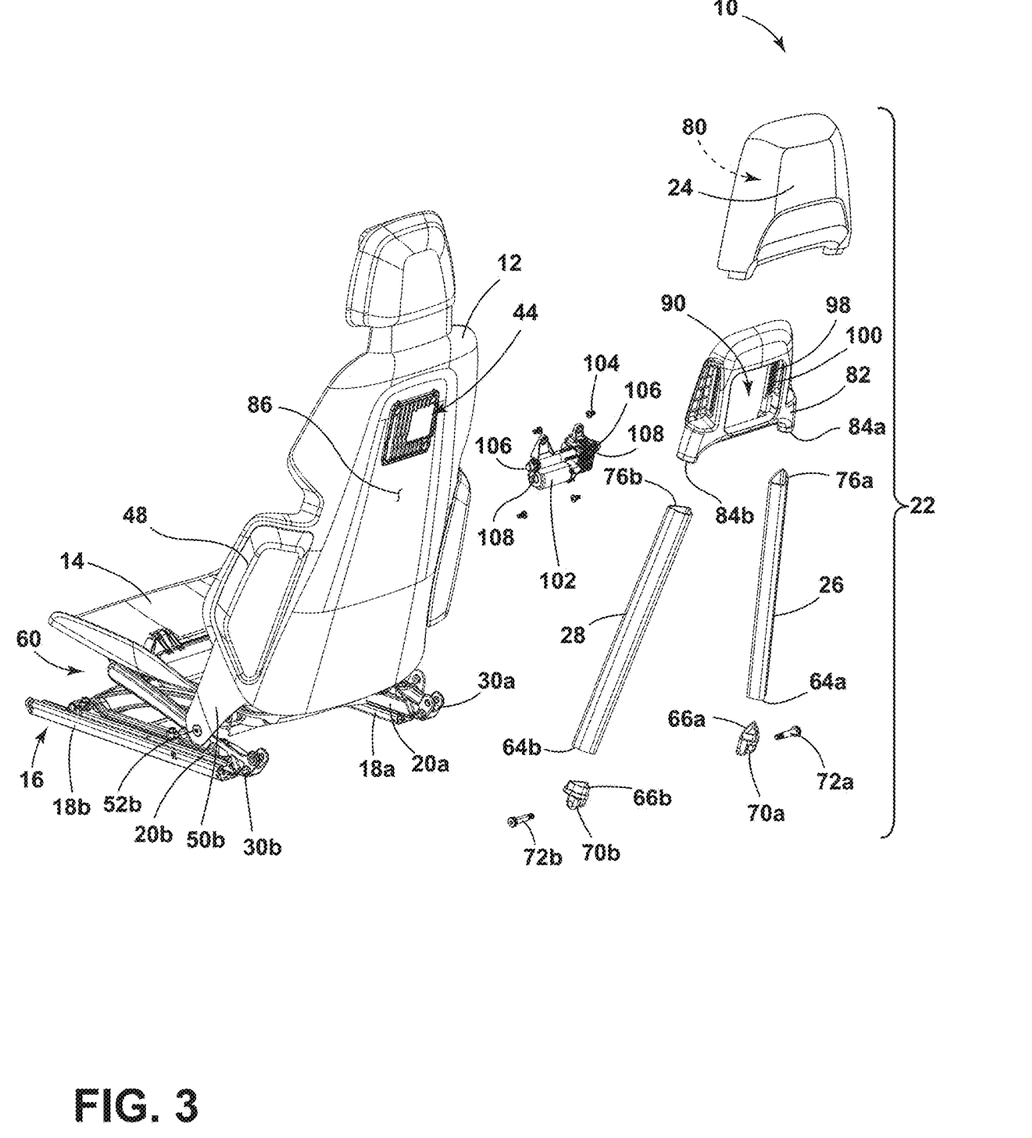
FIG. 3 is an exploded rear perspective view of the vehicle seating assembly of FIG. 1.

Referring now to FIGS. 2 and 3, the rear support assembly 22 is configured to be operably coupled with the seatback 12 proximate the opening 50. The rear support assembly 22 includes the base 24 operably coupled with first and second struts 26, 28, as previously introduced. Each of the first and second struts 26, 28 may formed of extruded aluminum. The struts 26, 28 may each be substantially hollow at least partially along the length of the strut 26, 28 or along the length of the strut 26, 28.

Each strut 26, 28 includes a lower end 64*a*, 64*b*. The lower end 64*a*, 64*b* is coupled with a lower end cap 66*a*, 66*b* configured to be rotatably coupled with the back end 30*a*, 30*b* of the respective bracket 20*a*, 20*b*. In various examples, the lower end 64*a*, 64*b* of each strut 26, 28 may be configured to be substantially hollow to at least partially receive the lower end cap 66*a*, 66*b*. In other examples, the lower end cap 66*a*, 66*b* may be coupled with the lower end 64*a*, 64*b* of the respective strut 26, 28 via adhesive, fasteners, or any other coupling method. In still other examples, the lower end cap 66*a*, 66*b* may be integrally formed with the lower end 64*a*, 64*b* of the respective strut 26, 28.

Each of the lower end caps 66*a*, 66*b* is configured to be pivotally coupled with the back end 30 of the respective bracket 20*a*, 20*b*. In various examples, each of the lower end caps 66*a*, 66*b* may include a flange 70*a*, 70*b* configured to be aligned with the back end 30*a*, 30*b* of the respective bracket 20*a*, 20*b*. The flange 70*a*, 70*b* and the back end 30*a*, 30*b* of the respective bracket 20*a*, 20*b* are configured to be rotatably coupled by a pivot 72*a*, 72*b*. The pivot 72*a*, 72*b* may be any pivot member including, but not limited to, for example, screws, pins, bolts, etc. The pivot 72*a*, 72*b* is configured to fix the respective lower end cap 66*a*, 66*b* to move laterally with the respective bracket 20*a*, 20*b* while being able to rotate about the pivot 72*a*, 72*b* as needed.

With continued reference to FIGS. 2 and 3, each strut 26, 28 of the rear support assembly 22 further includes an upper end 76*a*, 76*b* fixedly coupled with the base 24. The base 24 may be narrower than the separation between the brackets 20*a*, 20*b* of the track assembly 16 such that the struts 26, 28 and the base 24 form an A-frame support. The A-frame shape of the rear support assembly 22, as illustrated, may allow for moving a seatback 12 between an upright position and reclined position while providing additional support against rear loading of the seating assembly 10 by having an A-frame and/or truss shape as opposed to a cantilever shape. By employing the A-frame support, the seatback and A-frame support may only experience tension and compression loads such that the seatback may not be exposed to bending loads.

The base 24 may define a cavity 80 configured to receive a frame 82. As previously noted, each of the struts 26, 28 may be hollow, including at the upper end 76*a*, 76*b*. The frame 82 includes first and second extensions 84*a*, 84*b* configured to correspond with the first and second struts 26, 28, respectively. The first extension 84*a* is configured to be at least partially received within the upper end 76*a*, 76*b* of the first strut 26, and the second extension 84*b* is configured to be at least partially received within the upper end 76*a*, 76*b* of the second strut 28. The first and second struts 26, 28 are thereby coupled with the frame 82 at the extensions 84*a*, 84*b*.

Figure 4:
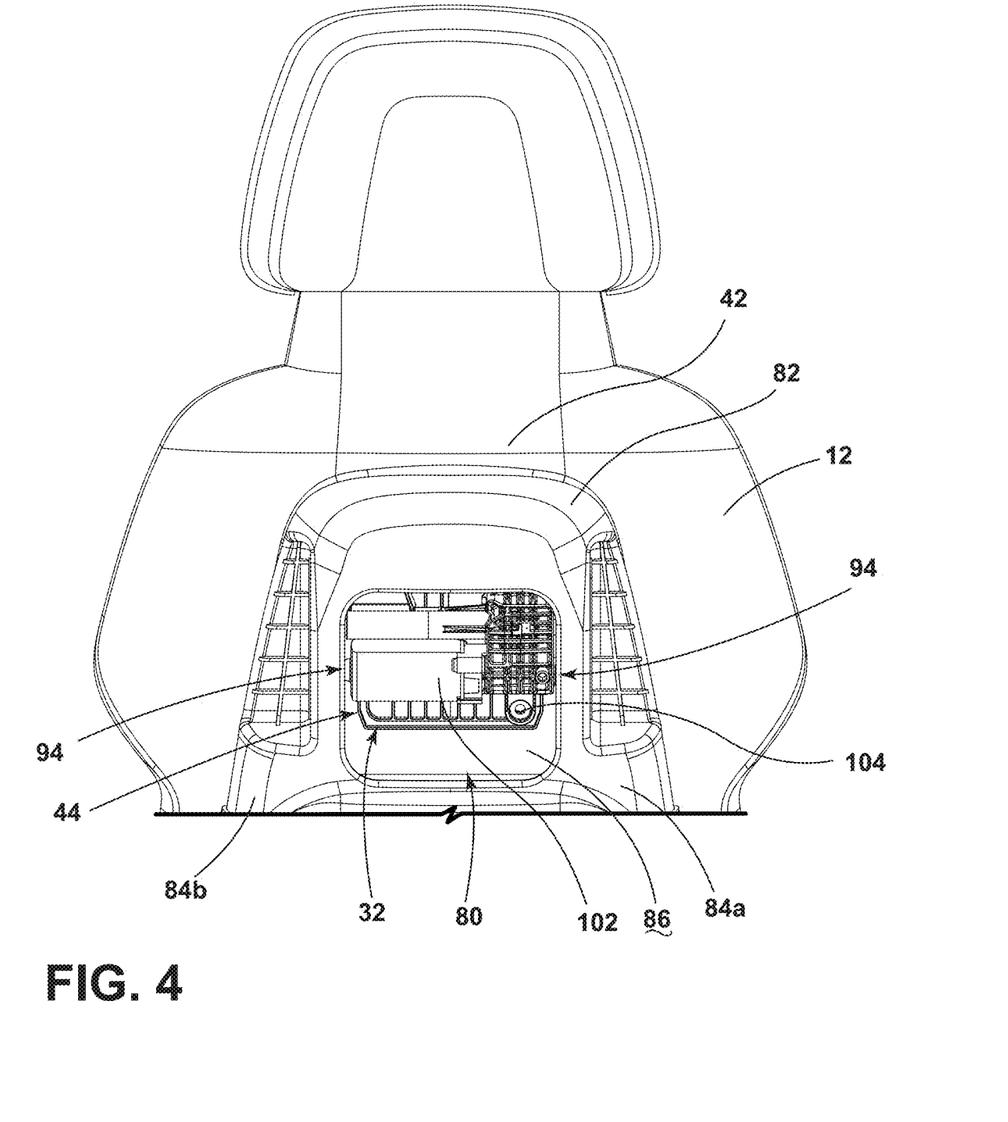
FIG. 4 is a rear elevational view of a base of the movable rear support and an actuator assembly operably coupled with the base.

Referring now to FIGS. 1-4, the frame 82 may be operably coupled with a rear surface 86 of the seatback 12 via the actuator assembly 32. The actuator assembly 32 is fixedly coupled with the seatback 12 proximate the opening 50. As shown in FIG. 1, a bracket 88 may be positioned to surround the opening 50 and provide support for coupling the actuator assembly 32 with the body 42 of the seatback 12. When the actuator assembly 32 is coupled with the body 42 of the seatback 12, the actuator assembly 32 is positioned to align with the opening 50 and extend rearward from the rear surface 86 of the seatback 12, as best shown in FIG. 4.

Figure 5:
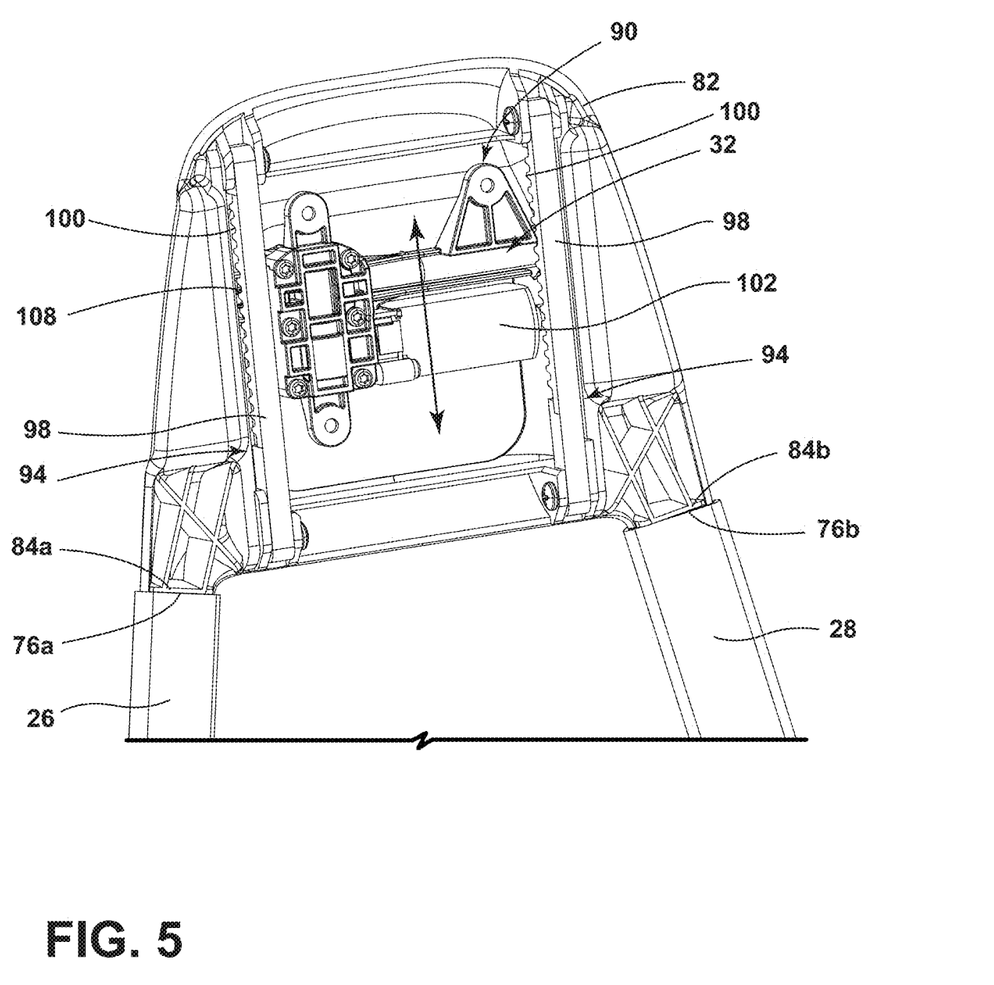
FIG. 5 is a front perspective view of the base of the movable rear support of FIG. 4 removed from the vehicle seat.
Figure 6A:
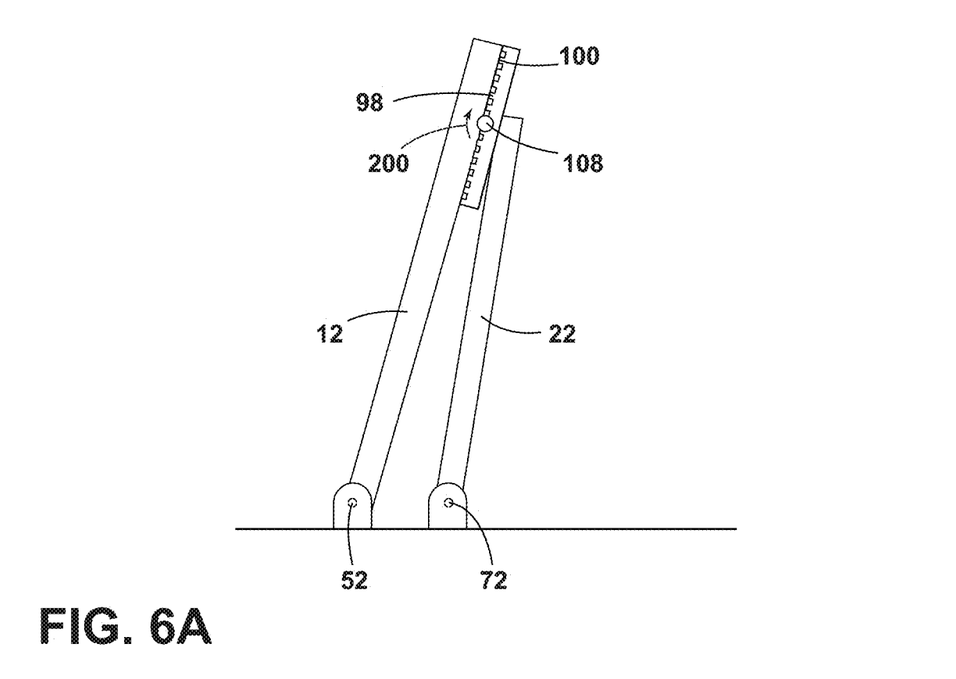
FIG. 6A is a schematic side profile view of the vehicle seating assembly of FIG. 1 in an upright position.
Figure 6B:
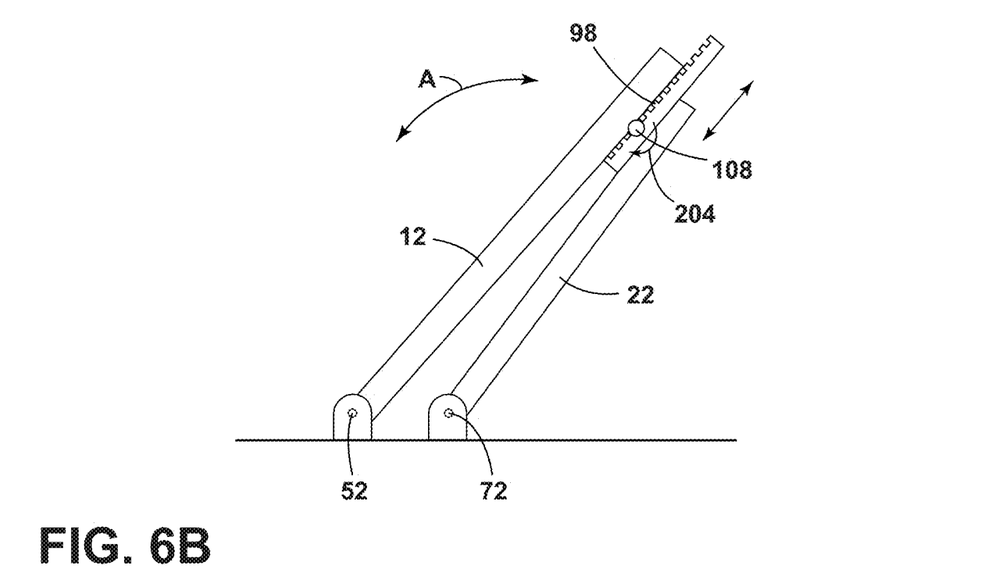
FIG. 6B is a schematic side profile view of the vehicle seating assembly of FIG. 1 in a reclined position.

Referring now to FIGS. 4 and 5, the frame 82 of the base 24 may define a receiving well 90 configured to at least partially receive the actuator assembly 32. The receiving well 90 is defined such that, when the base 24 is operably coupled with the seatback 12 by the actuator assembly 32, the receiving well 90 is in communication with the opening 50.

As best shown in FIG. 5, the receiving well 90 is at least partially defined by one or more interior edges 94 of the frame 82. Each interior edge 94 is positioned to extend substantially vertically along the frame 82. Where a pair of interior edges 94 are used, as illustrated in FIGS. 4 and 5, the interior edges 94 may be positioned substantially parallel. In other words, the interior edges 94 may be opposing interior edges 94. Each interior edge 94 may be configured as a rack 98 having a plurality of teeth 100. The rack 98 is configured to be engaged by the actuator assembly 32, as described in more detail elsewhere herein, to operably couple the frame 82 and the base 24 with the seatback 12.

Referring now to FIGS. 3-5, the actuator assembly 32 includes a motor 102 fixedly coupled with the rear surface 86 of the seatback 12. For examples, the motor 102 may be coupled with seatback 12 by a plurality of fasteners 104 extending through the seatback 12. In some examples, the plurality of fasteners 104 may be configured to engage with the bracket 88 extending about the opening 50 of the seatback 12. In other examples, the motor 102 may be coupled with the seatback 12 without a bracket 88. In still other examples, the motor 102 may be coupled with the seatback 12 using a plurality of brackets.

The motor 102 may be any motor configured to drive one or more pinions 106. As illustrated in FIG. 3, the motor 102 may include two laterally opposing pinions 106 extending from opposing sides of the motor 102. Each pinion 106 is coupled with or integrally formed with a pinion gear 108. Each pinion gear 108 is configured to engage with one of the respective racks 98. In other words, each pinion gear 108 may be configured to engage with the plurality of teeth 100 of one of the racks 98. When the pinion gear 108 is engaged with the respective rack 98, the pinion gear 108 is positioned between the rack 98 and the frame 82 of the base 24. The positioning of the pinion gear 108 between the rack 98 and the frame 82 is configured to operably couple the frame 82 with the actuator assembly 32 and, subsequently, with the seatback 12.

Referring now to FIGS. 4-6B, when the motor 102 is actuated, each pinion gear 108 is rotated along the respective rack 98. The rotation of the pinion gear 108 engages the plurality of teeth 100 of the respective rack 98 to move pinion gear 108 vertically along the rack 98. As shown in FIG. 6A, when the pinion gear 108 is at a first position on the rack 98, the seatback 12 is in the upright position. When the pinion gear 108 is rotated in a first direction 200, the pinion gear 108 moves vertically downward so that the base 24 slides along the rear surface 86 of the seatback 12, reclining the seatback 12 along arrow A. To return the seatback 12 to the upright position, the pinion gear 108 is rotated in a second, opposite direction 204 and is moved along the length of the rack 98. It is contemplated that the pinion gear 108 and the rack 98 may be configured such that the seatback 12 may be movable into a pitched position as the pinion gear 108 continues rotation in the second direction, without departing from the scope of the present disclosure.

Figure 7:
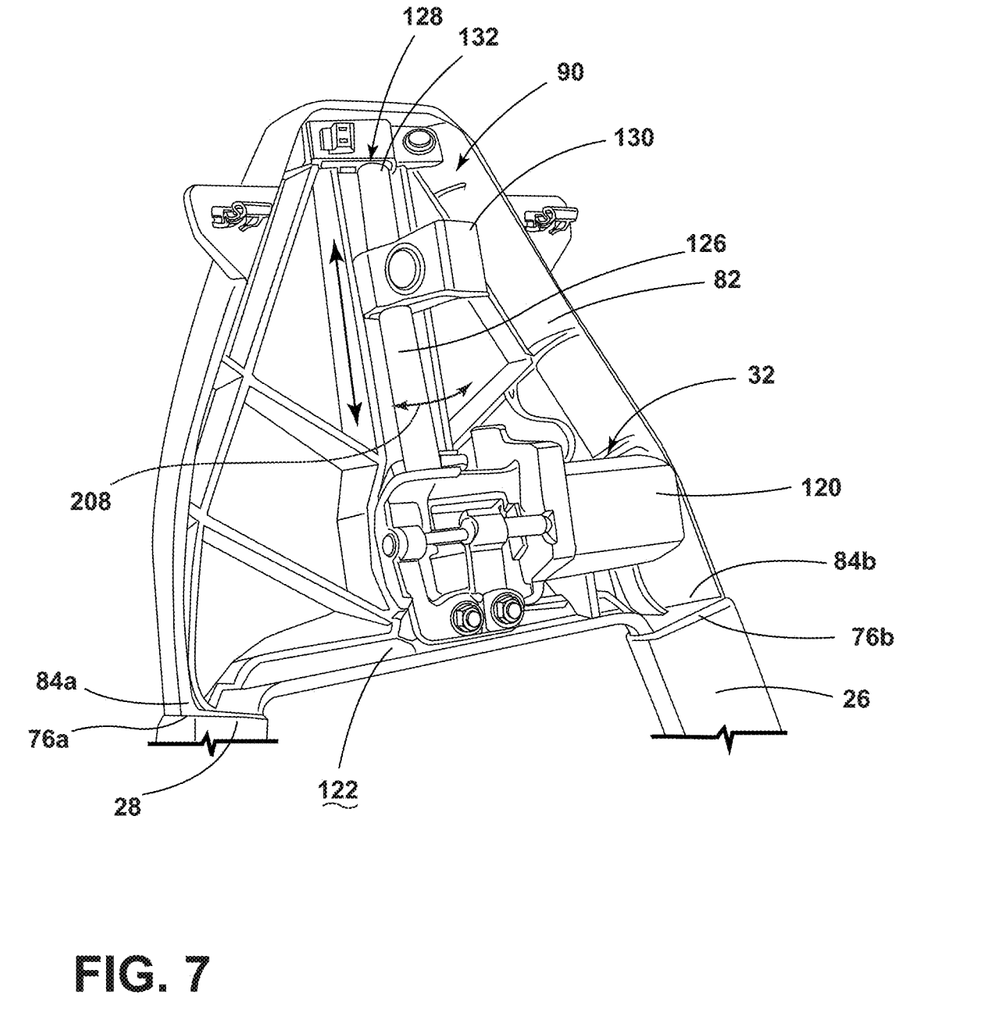
FIG. 7 is an alternate actuator assembly for coupling with a base of the movable rear support of FIG. 1, according to various examples.

Referring now to FIG. 7, an alternate actuator assembly 32 is illustrated coupled with the frame 82 of the base 24. The alternate actuator assembly 32 includes a motor 120 coupled with an inner surface 122 of the frame 82. The motor 120 may be fixedly coupled with the frame 82 via fasteners, adhesive, welding, or any other coupling method fixing the motor 120 with the frame 82. The actuator assembly 32 further includes a spindle 126 extending upward from the motor 120. The spindle 126 is coupled with the frame 82 and may extend along at least part of the length of the frame 82. For example, the motor 120 may be coupled with the frame 82 at a bottom edge of the inner surface 122, and the frame 82 may define a receiving well 128 proximate a top edge of the inner surface 122. The spindle 126 is rotatably driven by the motor 120 as illustrated by arrow 208 of FIG. 7. The receiving well 128 of the frame 82 may be configured to receive a free end 132 of the spindle 126, as shown in FIG. 7, such that the spindle 126 rotates within the receiving well 128 when the motor is actuated.

A nut 130 is movably coupled with the spindle 126 and is translatable along the length of the spindle 126 as the spindle 126 is rotated by the motor 120. The nut 130 is fixedly coupled with the seatback 12 to position the base 24 substantially abutting the rear surface 86 of the seatback 12, as shown in FIG. 1. When the motor 120 is actuated, the nut 130 is moved linearly along the spindle 126. As the nut 130 moves linearly along the spindle 126, the base 24 is moved linearly along the rear surface 86 of the seatback 12. The vertical movement of the nut 130 along the spindle 126 and the base 24 relative to the seatback 12 moves the seatback 12 from an upright position to a reclined position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seating assembly, comprising:
   a seatback movable between an upright position and a reclined position relative to a seat base;
   a track assembly including a bracket slidably received by a rail, wherein the bracket is operably coupled with at least one of the seatback and the seat base;
   a rear support assembly positioned to extend at least partially along the seatback and including:
      a base operably coupled with the seatback; and
      first and second struts extending downward from the base, wherein one of the first and second struts is pivotally coupled with a back end of the bracket; and
   an actuator assembly operably coupled with the base and configured to move the seatback between the upright position and the reclined position, wherein the seatback is directly coupled with the bracket at a pivot.

2. The vehicle seating assembly of claim 1, wherein each of the first and second struts includes an end cap pivotally coupled with the back end of the bracket.

3. The vehicle seating assembly of claim 1, further comprising:
   a lift assembly configured to couple the seat base with the bracket.

4. The vehicle seating assembly of claim 1, wherein the bracket includes a central portion positioned forward of the end of the bracket, and further wherein the central portion and the end of the bracket each extend upward toward the seat base.

5. The vehicle seating assembly of claim 4, wherein the seatback is rotatably coupled with the central portion of the bracket.

6. The vehicle seating assembly of claim 1, wherein the base includes a vertically extending rack and the actuator assembly includes a pinion gear configured to be engaged with the rack, wherein rotation of the pinion gear along the rack is configured to move the seatback between the upright position and the reclined position.

7. The vehicle seating assembly of claim 1, wherein the actuator assembly includes a spindle coupled with the base and a nut rotatably coupled with a spindle, and wherein the nut is fixedly coupled with the seatback such that movement of the nut along the spindle moves the seatback between the upright position and the reclined position.

8. A vehicle seating assembly, comprising:
- a seatback movable between an upright position and a reclined position;
- a track assembly including a bracket, wherein the seatback is pivotally coupled with the bracket;
- a rear support assembly positioned to extend at least partially along the seatback and including:
  - a base operably coupled with the seatback; and
  - first and second struts extending downward from the base, wherein one of the first and second struts is pivotally coupled with an end of the bracket; and
- an actuator assembly fixedly coupled with the seatback and configured be operably engaged with the rear support assembly to move the seatback between the upright position and the reclined position, wherein the base of the rear support assembly is slidably coupled with a rear surface of the seatback.

9. The vehicle seating assembly of claim 8, wherein the base includes a frame having opposing interior edges and a vertically extending rack positioned on one of the interior edges, the rack defining a plurality of teeth.

10. The vehicle seating assembly of claim 9, wherein the actuator assembly includes a pinion gear configured to be engaged with the rack such that rotation of the pinion gear along the rack is configured to move the seatback between the upright position and the reclined position.

11. The vehicle seating assembly of claim 8, wherein the seatback defines an opening and the actuator assembly is aligned with the opening.

12. The vehicle seating assembly of claim 11, wherein the seatback includes a bracket extending about the opening and configured to at least partially support the actuator assembly.

13. The vehicle seating assembly of claim 8, further comprising:
- a seat base operably coupled with the bracket and spaced apart from the seatback.

14. A vehicle seating assembly, comprising:
- a seatback movable between an upright position and a reclined position;
- a track assembly including a bracket, wherein the seatback is pivotally coupled with the bracket;
- a rear support assembly positioned to extend at least partially along the seatback and including:
  - a base operably coupled with the seatback; and
  - first and second struts extending downward from the base, wherein one of the first and second struts is pivotally coupled with a back end of the bracket; and
- an actuator assembly fixedly coupled with the base and configured to move the base linearly along the seatback to move the seatback between the upright position and the reclined position.

15. The vehicle seating assembly of claim 14, wherein the base includes a frame defining a receiving well configured to at least partially receive the actuator assembly.

16. The vehicle seating assembly of claim 15, wherein the actuator assembly includes an actuator fixedly coupled with the frame and a spindle rotatably driven by the actuator and having a free end received by and rotatable within the receiving well.

17. The vehicle seating assembly of claim 16, wherein a nut is movable along the spindle and is fixedly coupled with a rear surface of the seatback.

18. The vehicle seating assembly of claim 14, further comprising:
- a seat base operably coupled with the bracket and spaced apart from the seatback.

* * * * *